United States Patent Office 3,817,764
Patented June 18, 1974

---

3,817,764
FIBERIZABLE FLUORINE-FREE GLASS COMPOSITIONS
Warren W. Wolf, Columbus, Ohio, assignor to Owens-Corning Fiberglas Corporation
No Drawing. Filed June 27, 1972, Ser. No. 266,823
Int. Cl. C03c 13/00, 3/08
U.S. Cl. 106—50          5 Claims

ABSTRACT OF THE DISCLOSURE

Glass compositions are disclosed which are useful in making textile glass fibers by a rotary or centrifuging process. The compositions have the following range of proportions (by weight): $SiO_2$, 49 to 57%; $Al_2O_3$, 3 to 5%; $B_2O_3$, 6 to 12%; $Na_2O$, 18 to 20%; CaO, 0 to 2%; $TiO_2$, 9 to 12%; $ZrO_2$, 0 to 7%; $Li_2O$, 0 to 1% and $Fe_2O_3$, 0 to 0.5%.

BACKGROUND OF THE INVENTION

This invention concerns fiberizable glass compositions which are particularly useful in making staple or continuous textile fibers by a rotary or centrifuging process as shown in U.S. Pat. Nos. 3,032,813; 3,149,944; 3,161,920; 3,250,602; 3,254,482 and 3,357,807.

Glass composition which are useful for this purpose should have certain properties or characteristics. Preferably the viscosity of the glass should be $10^{3.3}$ poises at 1800° F. or less. Glass viscosities which would be greater than this at 1800° F. or less would substantially reduce the life of the metallic rotor or spinner used to attenuate the glasses into fibers. This of course would adversely affect the economics of commercial production of textile glass fibers.

Another criteria which should be met by glasses to be used in a rotary textile process is that the glasses have a surface tension of 300 dynes per centimeter or less at a viscosity of $10^{3.3}$ poises. By meeting or exceeding this requirement it is possible to more easily form continuous fibers and form longer staple fibers while keeping beads or balls of non-fibrous glass to a minimum.

The liquidus of the glasses used in rotary textile processes should preferably be less than 1600° F. This is important because the rotor or spinner temperature may be as low as 1650 to 1700° F. And if the liquidus temperature is in excess of 1600° F. undesirable devitrification of the glass on the rotor face could result.

Another desirable feature of any glass composition is that it be free of fluorine. Fluorine is often added to glass compositions as $CaF_2$ or sodium silicofluoride ($Na_2SiF_6$) and can readily volatilize out of molten glass prior to forming it into fibers. When this happens fluorine can become a pollutant of the surrounding air and water.

With these criteria in mind the fiberizable glass compositions of this invention were developed.

SUMMARY OF THE INVENTION

Glass compositions capable of being fiberized as staple or continuous textile fibers by a rotary or centrifuging process as shown in U.S. Pat. Nos. 3,032,813; 3,149,944; 3,161,920; 3,250,602; 3,254,482 and 3,357,807 have been discovered. These glass compositions and glass fibers made from them fall within the following broad range of proportions:

| Ingredient: | Percent by weight |
|---|---|
| $SiO_2$ | 49–57 |
| $Al_2O_3$ | 3–5 |
| $B_2O_3$ | 6–12 |
| $Na_2O$ | 18–20 |
| CaO | 0–2 |
| $TiO_2$ | 9–12 |
| $ZrO_2$ | 0–7 |
| $Fe_2O_3$ | 0–0.5 |
| $Li_2O$ | 0–1 |

Glass compositions falling within this range of proportions will have a viscosity of $10^{3.3}$ poises at 1800° F. or less, a liquidus temperature of 1500° F. or less and a surface tension of 300 dynes per centimeter at a viscosity of $10^{3.3}$ poises.

DESCRIPTION OF THE INVENTION

The glass compositions of this invention and the glass fibers made from them fall within the above broad range of ingredients. A preferred range of ingredients is as follows:

| Ingredient: | Percent by weight |
|---|---|
| $SiO_2$ | 55–57 |
| $Al_2O_3$ | 3–4 |
| $B_2O_3$ | 9–10 |
| $Na_2O$ | 19–20 |
| $TiO_2$ | 11–12 |

Specific glass compositions embodying the principles of this invention are described in the following Examples 1 to 7.

EXAMPLE 1

| Ingredient: | Percent by weight |
|---|---|
| $SiO_2$ | 55.7 |
| $Al_2O_3$ | 4.6 |
| $B_2O_3$ | 6.4 |
| $Na_2O$ | 18.9 |
| CaO | 2 |
| $TiO_2$ | 11 |
| $Li_2O$ | 1 |

Liquidus: less than 1500° F.

| Log viscosity: | Temp., ° F. |
|---|---|
| 2.0 | 2075 |
| 2.25 | 1975 |
| 2.50 | 1877 |
| 2.75 | 1802 |
| 3.0 | 1727 |
| 3.3 | 1665 |
| 3.5 | 1620 |

EXAMPLE 2

| Ingredient: | Percent by weight |
|---|---|
| $SiO_2$ | 52.68 |
| $Al_2O_3$ | 4.65 |
| $B_2O_3$ | 8.31 |
| $Na_2O$ | 18.93 |
| $TiO_2$ | 10.92 |
| $ZrO_2$ | 3 |
| $Li_2O$ | 1 |
| $Fe_2O_3$ | 0.50 |

Liquidus: less than 1500° F.

| Log viscosity: | Temp., °F. |
|---|---|
| 2.0 | 2050 |
| 2.25 | 1953 |
| 2.50 | 1870 |
| 2.75 | 1800 |
| 3.0 | 1735 |
| 3.3 | 1680 |
| 3.5 | 1630 |

EXAMPLE 3

| Ingredient: | Percent by weight |
|---|---|
| $SiO_2$ | 51.3 |
| $Al_2O_3$ | 4.8 |
| $B_2O_3$ | 11.6 |
| $Na_2O$ | 18.6 |
| $TiO_2$ | 10.7 |
| $ZrO_2$ | 2.8 |

Liquidus: less than 1500° F.

Surface tension

| Dynes per centimeter: | Temp., °F. |
|---|---|
| 227 | 2400 |
| 227 | 2200 |
| 227 | 2000 |
| 235 | 1900 |
| 247 | 1800 |
| 257 | 1700 |

| Log viscosity: | Temp., °F. |
|---|---|
| 2.0 | 2100 |
| 2.25 | 2000 |
| 2.50 | 1915 |
| 2.75 | 1840 |
| 3.0 | 1775 |
| 3.3 | 1705 |
| 3.5 | 1665 |

EXAMPLE 4

| Ingredient: | Percent by weight |
|---|---|
| $SiO_2$ | 56.3 |
| $Al_2O_3$ | 3.1 |
| $B_2O_3$ | 9.4 |
| $Na_2O$ | 19.1 |
| $TiO_2$ | 9.8 |
| $ZrO_2$ | 1.9 |

Liquidus: less than 1500° F.

| Log viscosity: | Temp., °F. |
|---|---|
| 2.0 | 2150 |
| 2.25 | 2050 |
| 2.50 | 1950 |
| 2.75 | 1875 |
| 3.0 | 1800 |
| 3.3 | 1740 |
| 3.50 | 1700 |

EXAMPLE 5

| Ingredient: | Percent by weight |
|---|---|
| $SiO_2$ | 49.6 |
| $Al_2O_3$ | 4.6 |
| $B_2O_3$ | 8.3 |
| $Na_2O$ | 18.9 |
| $TiO_2$ | 11 |
| $ZrO_2$ | 6.2 |
| $Li_2O$ | 1 |

Liquidus: less than 1500° F.

| Log viscosity: | Temp., °F. |
|---|---|
| 2.0 | 2060 |
| 2.25 | 1965 |
| 2.5 | 1885 |
| 2.75 | 1815 |
| 3.0 | 1750 |
| 3.3 | 1685 |
| 3.5 | 1645 |

EXAMPLE 6

| Ingredient: | Percent by weight |
|---|---|
| $SiO_2$ | 56.68 |
| $Al_2O_3$ | 3.09 |
| $B_2O_3$ | 9.48 |
| $Na_2O$ | 19.23 |
| $TiO_2$ | 11.10 |
| $Fe_2O_3$ | 0.40 |

Liquidus: less than 1500° F.

Surface tension

| Dynes per centimeter: | Temp., °F. |
|---|---|
| 245 | 2400 |
| 245 | 2200 |
| 249 | 2000 |
| 254 | 1900 |
| 269 | 1800 |

| Log viscosity: | Temp., °F. |
|---|---|
| 2.0 | 2105 |
| 2.25 | 2001 |
| 2.50 | 1914 |
| 2.75 | 1839 |
| 3.0 | 1772 |
| 3.3 | 1703 |
| 3.5 | 1658 |

EXAMPLE 7

| Ingredient: | Percent by weight |
|---|---|
| $SiO_2$ | 51.6 |
| $Al_2O_3$ | 4.6 |
| $B_2O_3$ | 8.3 |
| $Na_2O$ | 18.9 |
| $TiO_2$ | 11 |
| $ZrO_2$ | 4.1 |
| $Li_2O$ | 1 |

Liquidus: less than 1500° F.

| Log viscosity: | Temp., °F. |
|---|---|
| 2.0 | 2067 |
| 2.25 | 1977 |
| 2.50 | 1880 |
| 2.75 | 1810 |
| 3.0 | 1737 |
| 3.3 | 1675 |
| 3.5 | 1620 |

The viscosity determinations in Examples 1 to 7 were obtained using the apparatus and procedure described in U.S. Pat. No. 3,056,283 and in an article in *The Journal of the American Ceramic Society*, vol. 42, No. 11, November 1959, pages 537–541. The article is entitled "Improved Apparatus for Rapid Measurement of Viscosity of Glass at High Temperatures" by Ralph L. Tiede. Other specific viscosity determinations referred to herein also would be measured by the apparatus and procedure in the Tiede article.

The glass compositions of Examples 1, 2, 4, 5 and 7 would have a surface tension of 300 dynes per centimeter or less at a viscosity of $10^{3.3}$ poises.

The primary glass forming ingredients in the glass compositions of this invention are $SiO_2$ and $Al_2O_3$.

It has been found that the silica ($SiO_2$) content of these glasses should not exceed about 57% by weight of the glass composition. Greater amounts of silica can cause the formation of seeds in the glass which can cause fiber breakage.

Alumina ($Al_2O_3$) content should not exceed about 5% by weight in these glasses. It has been found that higher amounts of $Al_2O_3$, when $TiO_2$ and/or $ZrO_2$ are present in the glass, may increase the liquidus of the glass to undesirable levels. However amounts of $Al_2O_3$ ranging from 3 to 5% by weight help maintain commercially acceptable durability, especially water durability, of glass fibers made from these compositions.

Maintenance of the surface tension of these glasses within the desired limits (300 dynes per centimeter or less at a viscosity of $10^{3.3}$ poises) is aided by the presence of $B_2O_3$ in the range of 6 to 12% by weight. $B_2O_3$ is also a good fluxing agent.

Soda ($Na_2O$) another good fluxing agent, is used in these glass compositions to maintain the desired viscosity requirements ($10^{3.3}$ poises at 1800° F. or less) and to keep the glass melting and operating temperatures at commercially desirable levels. A portion of the soda used in these glass compositions can be added as sodium nitrate ($NaNO_3$). $NaNO_3$ has been found to be useful in maintaining a white color in the fibers.

Lithia ($Li_2O$) is useful as a fluxing agent. It is particularly useful to keep fiberizing temperatures at desired levels when $ZrO_2$ is included in a glass composition.

$TiO_2$ serves as a fluxing agent and helps maintain fiber durability. Zirconia ($ZrO_2$) also helps maintain fiber durability by reducing sodium leaching of glass textile fibers.

Calcia, CaO, when added to these compositions is used primarily as a fluxing agent.

$Fe_2O_3$ can enter these glass compositions either as an added ingredient or an impurity. In either case however it should not exceed about 0.5% by weight of the glass composition. When present in amounts close to 0.5% by weight $Fe_2O_3$ is believed, because of its ability to quickly emit heat, to aid in quickly chilling or cooling the glass fibers as they leave the fiber forming rotor or spinner. This cooling is believed to lessen the chances of the fibers being broken. It must also be recognized however that when $Fe_2O_3$ is present in amounts of about 0.5% by weight it can cause a green or yellow tinting of the glass fibers. This may be undesirable in certain end uses of textile fibers. Where fiber coloration is undesirable $Fe_2O_3$ content should be kept as low as possible.

Modifications and variations within the scope of the attached claims are intended to be included.

I claim:

1. Fiberizable, fluorine free glass compositions consisting essentially by weight of:

| | Percent |
|---|---|
| $SiO_2$ | 49–57 |
| $Al_2O_3$ | 3–5 |
| $B_2O_3$ | 6–12 |
| $Na_2O$ | 18–20 |
| CaO | 0–2 |
| $TiO_2$ | 9–12 |
| $ZrO_2$ | 0–7 |
| $Li_2O$ | 0–1 |
| $Fe_2O_3$ | 0–0.5 | wherein the glass compositions have a viscosity of $10^{3.3}$ poises at 1800° F. or less, a liquidius temperature of 1500° F. or less and a surface tension of 300 dynes per centimeter at a viscosity of $10^{3.3}$ poises.

2. Fiberizable, fluorine free glass compositions consisting essentially by weight of:

| | Percent |
|---|---|
| $SiO_2$ | 55–57 |
| $Al_2O_3$ | 3–4 |
| $B_2O_3$ | 9–10 |
| $Na_2O$ | 19–20 |
| $TiO_2$ | 11–12 | wherein the glass compositions have a viscosity of $10^{3.3}$ poises at 1800° F. or less, a liquidus temperature of 1500° F. or less and a surface tension of 300 dynes per centimeter at a viscosity of $10^{3.3}$ poises.

3. Fiberizable, fluorine free glass compositions capable of being drawn into textile fibers in a rotary or centrifuging fiber forming process consisting essentially by weight of:

| | Percent |
|---|---|
| $SiO_2$ | 49–57 |
| $Al_2O_3$ | 3–5 |
| $B_2O_3$ | 6–12 |
| $Na_2O$ | 18–20 |
| CaO | 0–2 |
| $TiO_2$ | 9–12 |
| $ZrO_2$ | 0–7 |
| $Li_2O$ | 0–1 |
| $Fe_2O_3$ | 0–0.5 | wherein the glass compositions have a viscosity of $10^{3.3}$ poises at 1800° F. or less, a liquidus temperature of 1500° F. or less and a surface tension of 300 dynes per centimeter at a viscosity of $10^{3.3}$ poises.

4. Textile, fluorine free glass fibers consisting essentially by weight of:

| | Percent |
|---|---|
| $SiO_2$ | 49–57 |
| $Al_2O_3$ | 3–5 |
| $B_2O_3$ | 6–12 |
| $Na_2O$ | 18–20 |
| CaO | 0–2 |
| $TiO_2$ | 9–12 |
| $ZrO_2$ | 0–7 |
| $Li_2O$ | 0–11 |
| $Fe_2O_3$ | 0–0.5 | wherein the glass fiber have a viscosity of $10^{3.3}$ poises at 1800° F. or less, a liquidus temperature of 1500° F. or less and a surface tension of 300 dynes per centimeter at a viscosity of $10^{3.3}$ poises.

5. Textile, fluorine free glass fibers consisting essentially by weight of:

| | Percent |
|---|---|
| $SiO_2$ | 55–57 |
| $Al_2O_3$ | 3–4 |
| $B_2O_3$ | 9–10 |
| $Na_2O$ | 19–20 |
| $TiO_2$ | 11–12 | wherein the glass fibers have a viscosity of $10^{3.3}$ poises at 1800° F. or less, a liquidus temperature of 1500° F. or less and a surface tension of 300 dynes per centimeter at a viscosity of $10^{3.3}$ poises.

References Cited

UNITED STATES PATENTS

| 2,640,784 | 6/1953 | Tiede | 106—50 |
| 2,877,124 | 3/1959 | Welsch | 106—50 |
| 2,882,173 | 4/1959 | Welsch | 106—50 |

FOREIGN PATENTS

| 7011037 | 2/1971 | Netherlands | 106—50 |

HELEN M. McCARTHY, Primary Examiner

U.S. Cl. X.R.

106—54